(12) United States Patent
Zhong et al.

(10) Patent No.: US 8,417,695 B2
(45) Date of Patent: Apr. 9, 2013

(54) IDENTIFYING RELATED CONCEPTS OF URLS AND DOMAIN NAMES

(75) Inventors: Qian Zhong, Los Angeles, CA (US); Riccardo Boscolo, Culver City, CA (US); Behnam A. Rezaei, Santa Clara, CA (US); Sam Talaie, Woodland Hills, CA (US); Vwani P. Roychowdhury, Los Angeles, CA (US)

(73) Assignee: Netseer, Inc., Santa Clara, CA (US)

( * ) Notice: Subject to any disclaimer, the term of this patent is extended or adjusted under 35 U.S.C. 154(b) by 612 days.

(21) Appl. No.: 12/610,202

(22) Filed: Oct. 30, 2009

(65) Prior Publication Data

US 2010/0114879 A1    May 6, 2010

Related U.S. Application Data

(60) Provisional application No. 61/109,867, filed on Oct. 30, 2008.

(51) Int. Cl.
*G06F 17/30* (2006.01)

(52) U.S. Cl.
USPC .............. 707/723; 707/748; 707/E17.112

(58) Field of Classification Search .......... 707/723
See application file for complete search history.

(56) References Cited

U.S. PATENT DOCUMENTS

| | | | |
|---|---|---|---|
| 5,581,764 A | 12/1996 | Fitzgerald et al. | |
| 5,956,708 A | 9/1999 | Dyko et al. | |
| 6,038,560 A | 3/2000 | Wical | |
| 6,098,064 A | 8/2000 | Pirolli et al. | |
| 6,233,575 B1 | 5/2001 | Agrawal et al. | |
| 6,242,273 B1 | 6/2001 | Goodwin et al. | |
| 6,397,682 B2 | 6/2002 | Kumar et al. | |
| 6,446,061 B1 | 9/2002 | Doerre et al. | |
| 6,544,357 B1 | 4/2003 | Hehmann et al. | |
| 6,549,896 B1 | 4/2003 | Candan et al. | |
| 6,665,837 B1 | 12/2003 | Dean et al. | |
| 6,886,129 B1 | 4/2005 | Raghavan et al. | |
| 7,031,308 B2 | 4/2006 | Garcia-Luna-Aceves et al. | |
| 7,051,023 B2 | 5/2006 | Kapur et al. | |
| 7,269,253 B1 | 9/2007 | Wu et al. | |

(Continued)

OTHER PUBLICATIONS

Bagrow, J. P. et al., "A Local Method for Detecting Communities," Physical Review E, vol. 72, No. 4, 2005, 046108, pp. 1-16.

(Continued)

*Primary Examiner* — Anteneh Girma
(74) *Attorney, Agent, or Firm* — Nixon Peabody LLP

(57) ABSTRACT

A solution for identifying related concepts of URLs and domain names includes using structural parsing to extract information from user input comprising a URL or domain name. The information includes one or more of a protocol, a location, and a subdirectory. Semantic parsing of the information is used to identify a first one or more concepts represented by one or more tokens within the extracted information. A content association map is queried to retrieve a second one or more concepts related to the first one or more concepts. Each of the concepts represents a unit of thought, expressed by a term, letter, or symbol. The concept association map includes a representation of concepts, concept metadata, and relationships between the concepts. The first one or more concepts and the second one or more concepts are ranked, and the ranked concepts are stored for displaying to one or more users of the computer platform.

21 Claims, 13 Drawing Sheets

U.S. PATENT DOCUMENTS

| | | | |
|---|---|---|---|
| 7,483,711 | B2 | 1/2009 | Burchfiel |
| 7,590,589 | B2 | 9/2009 | Hoffberg |
| 7,613,851 | B2 | 11/2009 | Rice et al. |
| 7,689,493 | B1 | 3/2010 | Sullivan et al. |
| 7,805,536 | B1 | 9/2010 | Kompella et al. |
| 7,822,745 | B2 | 10/2010 | Fayyad et al. |
| 7,831,586 | B2 | 11/2010 | Reitter et al. |
| 7,996,753 | B1 * | 8/2011 | Chan et al. ............ 715/200 |
| 2001/0049688 | A1 | 12/2001 | Fratkina et al. |
| 2002/0016782 | A1 | 2/2002 | Cooper |
| 2002/0049792 | A1 | 4/2002 | Wilcox et al. |
| 2002/0080180 | A1 | 6/2002 | Mander et al. |
| 2002/0087884 | A1 | 7/2002 | Shacham et al. |
| 2003/0115191 | A1 | 6/2003 | Copperman et al. |
| 2003/0187881 | A1 | 10/2003 | Murata et al. |
| 2003/0217139 | A1 | 11/2003 | Burbeck et al. |
| 2003/0217140 | A1 | 11/2003 | Burbeck et al. |
| 2003/0220866 | A1 | 11/2003 | Pisaris-Henderson et al. |
| 2003/0227479 | A1 | 12/2003 | Mizrahi et al. |
| 2004/0024739 | A1 | 2/2004 | Copperman et al. |
| 2004/0064438 | A1 | 4/2004 | Kostoff |
| 2004/0085797 | A1 | 5/2004 | Mei et al. |
| 2004/0093328 | A1 | 5/2004 | Damle |
| 2005/0010556 | A1 * | 1/2005 | Phelan ............ 707/3 |
| 2005/0021461 | A1 | 1/2005 | Flake et al. |
| 2005/0021531 | A1 | 1/2005 | Wen et al. |
| 2005/0055321 | A1 | 3/2005 | Fratkina et al. |
| 2005/0064618 | A1 | 3/2005 | Brown et al. |
| 2005/0086260 | A1 | 4/2005 | Canright et al. |
| 2005/0097204 | A1 | 5/2005 | Horowitz et al. |
| 2005/0113691 | A1 | 5/2005 | Liebschner |
| 2005/0114198 | A1 | 5/2005 | Koningstein et al. |
| 2005/0117593 | A1 | 6/2005 | Shand |
| 2005/0138070 | A1 | 6/2005 | Huberman et al. |
| 2005/0144065 | A1 | 6/2005 | Calabria et al. |
| 2005/0144162 | A1 | 6/2005 | Liang |
| 2005/0160107 | A1 | 7/2005 | Liang |
| 2005/0203838 | A1 | 9/2005 | Zhang et al. |
| 2005/0210027 | A1 | 9/2005 | Aggarwal et al. |
| 2005/0222900 | A1 | 10/2005 | Fuloria et al. |
| 2005/0256905 | A1 | 11/2005 | Gruhl et al. |
| 2005/0256949 | A1 | 11/2005 | Gruhl et al. |
| 2006/0047649 | A1 | 3/2006 | Liang |
| 2006/0080422 | A1 | 4/2006 | Huberman et al. |
| 2006/0085408 | A1 | 4/2006 | Morsa |
| 2006/0106793 | A1 * | 5/2006 | Liang ............ 707/5 |
| 2006/0112105 | A1 | 5/2006 | Adamic et al. |
| 2006/0168065 | A1 | 7/2006 | Martin |
| 2006/0171331 | A1 | 8/2006 | Previdi et al. |
| 2006/0209727 | A1 | 9/2006 | Jennings, III et al. |
| 2006/0212350 | A1 | 9/2006 | Ellis et al. |
| 2006/0218035 | A1 | 9/2006 | Park et al. |
| 2006/0235841 | A1 | 10/2006 | Betz et al. |
| 2006/0242017 | A1 | 10/2006 | Libes et al. |
| 2006/0271564 | A1 | 11/2006 | Muntz et al. |
| 2006/0294155 | A1 | 12/2006 | Patterson |
| 2007/0025364 | A1 | 2/2007 | Kodialam et al. |
| 2007/0033103 | A1 | 2/2007 | Collins et al. |
| 2007/0061300 | A1 | 3/2007 | Ramer et al. |
| 2007/0174255 | A1 | 7/2007 | Sravanapudi et al. |
| 2007/0198506 | A1 | 8/2007 | Attaran Rezaei et al. |
| 2007/0203903 | A1 | 8/2007 | Attaran Rezaei et al. |
| 2007/0239534 | A1 | 10/2007 | Liu et al. |
| 2007/0245035 | A1 | 10/2007 | Attaran Rezaei et al. |
| 2007/0300152 | A1 | 12/2007 | Baugher |
| 2008/0033932 | A1 | 2/2008 | DeLong et al. |
| 2008/0065483 | A1 | 3/2008 | Ball |
| 2008/0086592 | A1 | 4/2008 | Stephani |
| 2008/0104061 | A1 | 5/2008 | Rezaei |
| 2008/0232809 | A1 | 9/2008 | Beshai et al. |
| 2008/0256061 | A1 | 10/2008 | Chang et al. |
| 2008/0301033 | A1 | 12/2008 | Singh et al. |
| 2009/0043648 | A1 | 2/2009 | Mahdian et al. |
| 2009/0046678 | A1 | 2/2009 | Lee et al. |
| 2009/0086663 | A1 | 4/2009 | Ho et al. |
| 2009/0157855 | A1 | 6/2009 | Adam et al. |
| 2009/0168768 | A1 | 7/2009 | Chiabaut et al. |
| 2009/0265475 | A1 | 10/2009 | Fujita |
| 2009/0281900 | A1 | 11/2009 | Rezaei et al. |
| 2009/0296719 | A1 | 12/2009 | Maier et al. |
| 2009/0300009 | A1 | 12/2009 | Rezaei et al. |
| 2011/0113032 | A1 | 5/2011 | Boscolo et al. |

OTHER PUBLICATIONS

Bollobas, B., "Random Graphs," Second Edition, Cambridge University Press, United Kingdom, 2001, Chapter 1 and 2, pp. 1-59.

Boscolo, R., et al., "Functionality Encoded in Topology? Discovering Macroscopic Regulatory Modules from Large-Scale Protein-DNA Interaction Networks," Reprint arXiv:q-bio/0501039, Jan. 2005.

Chung, F. et al., "The Small World Phenomenon in Hybrid Power Law Graphs," Lect. Notes Phys., vol. 650, 2004, pp. 89-104.

Clauset, A. et al., "Finding Community Structure in Very Large Networks," Physical Review, vol. 70, No. 6, Dec. 2004, 066111.

Erdos, P. et al., "On the Evolution of Random Graphs," Publication of the Mathematical Institute of the Hungarian Academy of Sciences, vol. 5, 1960, pp. 343-347.

Erdos, P. et al., "On the Strength of Connectedness of a Random Graph," Acta Mathematica Scientia Hungarica, vol. 12, Nos. 1-2, 1961, pp. 261-267.

Flake, G. W. et al., "Self-Organization and Identification of Web Communities," IEEE Computer Society, vol. 35, Issue 3, Mar. 2002, pp. 66-71.

Franceschetti, M. et. al., "Navigation in Small World Networks, a Scale-Free Continuum Model," Jul. 2003, pp. 1-9.

Garton, L., et al., "Studying On-Line Social Networks," Doing Internet Research, Edited by S. Jones, Thousand Oaks, Calif., 1999, pp. 75-105.

Girvan, M. et al., "Community Structure in Social and Biological Networks," PNAS, vol. 99, No. 12, Jun. 2002, pp. 7821-7826.

Golbeck, "Accuracy of Metrics for Inferring Trust and Reputation in Semantic Web-based Social Networks," Apr. 2004, pp. 1-11.

Gonzalez-Barahona, J. M. et al., "Community Structure of Modules in the Apache Project," MSR '05: Proceedings of the 2005 International Workshop on Mining Software Repositories, 2005.

Kernighan, B. W. et al., "An Efficient Heuristic Procedure for Partitioning Graphs," The Bell System Technical Journal 49, Feb. 1970, pp. 291-307.

Lyons, R. et al., "Probability on Trees and Networks," Apr. 17, 2005, pp. 1-53.

Manku, G. S. et. al., "Know thy Neighbor: the Power of Lookahead in Randomized P2P Networks," STOC'04, Jun. 2004, pp. 1-10.

Newman, M. E. J., "Coauthorship Networks and Patterns of Scientific Collaboration," PNAS, vol. 101, Apr. 2004, pp. 5200-5205.

Newman, M. E. J., "Fast Algorithm for Detecting Community Structure in Networks," Physical Review E 69, Jun. 2004, pp. 066133.1-066133.5.

Newman, M.E.J. et al. "Finding and Evaluating Community Structure in Networks," Physical Review E, vol. 69, 026113, 2004, pp. 1-16.

Owczarek, A. L. et al., "Generalised Percolation Probabilities for the Self-Dual Potts Model," J. Phys. A: Math. Gen. 20, Apr. 1987, pp. 5263-5271.

Page, L. et al., "The PageRank Citation Ranking: Bringing Order to the Web," Technical Report, Stanford InfoLab, 1999.

Patch, K., "Simple Search Lightens Net load," TRN, Sep. 2004, pp. 1-3.

Pons, P. et al., "Computing Communities in Large Networks Using Random Walks," ArXiv Condensed Matter e-prints, Dec. 2004.

Pothen, A. et al., "Partitioning Sparse Matrices with Eigenvectors of Graphs," Society of Industrial and Applied Mathematics, SIAM Journal on Matrix Analysis and Applications, vol. 11, No. 3, Jul. 1990, pp. 430-452.

Radicchi, F. et al., "Defining and Identifying Communities in Networks," PNAS, vol. 101, No. 9, Mar. 2004, pp. 2658-2663.

Rives, A. W. et al., "Modular Organization of Cellular Networks," PNAS, vol. 100, No. 3, Feb. 2003, pp. 1128-1133.

Sarshar, N. et al., "Scalable Percolation Search in Power Law Networks," Jun. 2004, Department of Electrical Engineering, University of California, Los Angeles, pp. 1-13.

Scott, J. "Social Network Analysis: A Handbook," 2nd Edition, Sage Publications, London, 2000, Chapter 4, pp. 63-81.
Wasserman, S., "Social Network Analysis: Methods and Applications," Cambridge University Press, Cambridge, England, 1994, pp. 17-20 and Chapter 7, pp. 249-290.
Wellman, B. et al., "Computer Networks as Social Networks: Collaborative Work, Telework, and Virtual Community," Annual Reviews Sociology, vol. 22, No. 1, 1996, pp. 213-238.
Wu, F. et al., "Finding Communities in Linear Time: a Physics Approach," The European Physical Journal B, vol. 38, No. 2, 2004, pp. 331-338.
Zachary, W. W. "An Information Flow Model for Conflict and Fission in Small Groups," Journal of Anthropological Research, vol. 33, No. 4, Winter, 1977, pp. 452-473.
Chinese Office Action (First) in Chinese Patent Application No. 200680025190.6, dated Sep. 11, 2009.
Chinese Office Action (Second) in Chinese Patent Application No. 200680025190.6, dated Jun. 3, 2010.
International Search Report and Written Opinion for PCT Application No. PCT/US2006/14160, mailed Sep. 4, 2007.
International Search Report and Written Opinion for PCT Application No. PCT/US2007/001335, mailed Feb. 12, 2008.
International Search Report and Written Opinion for PCT Application No. PCT/US2007/001694, mailed Feb. 14, 2008.
International Search Report and Written Opinion for PCT Application No. PCT/US2007/005504, mailed Jul. 29, 2008.
Office Action in U.S. Appl. No. 11/125,329, mailed Mar. 30, 2010.
Office Action in U.S. Appl. No. 11/125,329, mailed Jun. 24, 2009.
Notice of Allowance in U.S. Appl. No. 11/125,329, mailed Feb. 2, 2011.
Office Action in U.S. Appl. No. 11/624,674, mailed Mar. 15, 2010.
Office Action in U.S. Appl. No. 11/624,674, mailed Sep. 21, 2010.
Office Action in U.S. Appl. No. 11/625,279, mailed Mar. 18, 2009.
Office Action in U.S. Appl. No. 11/625,279, mailed May 13, 2010.
Office Action in U.S. Appl. No. 11/625,279, mailed Oct. 25, 2010.
Office Action in U.S. Appl. No. 11/625,279, mailed Dec. 8, 2009.
Office Action in U.S. Appl. No. 11/680,599, mailed Jan. 5, 2011.
Office Action in U.S. Appl. No. 11/680,599, mailed Apr. 29, 2009.
Office Action in U.S. Appl. No. 11/680,599, mailed May 21, 2010.
Office Action in U.S. Appl. No. 11/923,546, mailed Feb. 26, 2010.
Office Action in U.S. Appl. No. 11/923,546, mailed Aug. 2, 2010.
Office Action in U.S. Appl. No. 11/923,546, mailed Dec. 22, 2010.
Office Action in U.S. Appl. No. 11/923,546, mailed Jun. 3, 2011.
Office Action in U.S. Appl. No. 12/130,171, mailed Apr. 1, 2011.
U.S. Appl. No. 13/098,870, filed May 2, 2011.
Chao, I. et al., "Tag Mechanisms Evaluated for Coordination in Open Multi-Agent Systems," ESAW 2007, LNAI 4995, Springer-Verlag Berlin Heidelberg, 2008, pp. 254-269.
Franceschetti et. al., "Closing the Gap in the Capacity of Wireless Networks Via Percolation Theory," Oct. 26, 2004, IEEE, pp. 1-10.
Kini et. al., "Fast and Efficient Randomized Flooding on Lattice Sensor Networks", Nov. 19, 2004, Drexler University, pp. 1-33.
Weikum, G. et al., "Towards Self-Organizing Query Routing and Processing for Peer-to-Peer Web Search," DELIS-TR-0287, 2005, 19 pages.
Notice of Allowance in U.S. Appl. No. 13/098,870, mailed Jun. 28, 2012.
Office Action in U.S. Appl. No. 11/624,674, mailed Dec. 20, 2011.
Office Action in U.S. Appl. No. 11/625,279, mailed Sep. 16, 2011.
Office Action in U.S. Appl. No. 11/625,279, mailed Apr. 17, 2012.
Office Action in U.S. Appl. No. 11/680,599, mailed Aug. 29, 2011.
Office Action in U.S. Appl. No. 11/680,599, mailed Apr. 30, 2012.
Office Action in U.S. Appl. No. 11/923,546, mailed Aug. 27, 2012.
Office Action in U.S. Appl. No. 12/130,171, mailed Oct. 19, 2011.
Office Action in U.S. Appl. No. 12/130,171, mailed Aug. 15, 2012.
Office Action in U.S. Appl. No. 12/436,748, mailed Sep. 16, 2011.
Office Action in U.S. Appl. No. 12/436,748, mailed May 2, 2012.
Office Action in U.S. Appl. No. 12/476,205, mailed Oct. 12, 2011.
Office Action in U.S. Appl. No. 12/476,205, mailed Jul. 3, 2012.
Office Action in U.S. Appl. No. 12/906,051, mailed Mar. 13, 2012.

* cited by examiner

IDENTIFYING RELATED CONCEPTS OF URLS AND DOMAIN NAMES

CROSS REFERENCE TO RELATED APPLICATIONS

This application claims the benefit of U.S. provisional patent application No. 61/109,867 filed Oct. 30, 2008, entitled "Methodology of Identifying Related Concepts of URLs and Domain Names."

This application is related to U.S. provisional patent application No. 61/050,958 filed May 6, 2008, entitled "Methods and Apparatus for Discovering Relevant Concept and Context for Content Specific Node," and U.S. patent application Ser. No. 12/436,748 filed on May 6, 2009, entitled "Discovering Relevant Concept and Context for Content Node."

FIELD OF THE INVENTION

The present invention relates to the field of computer science. More particularly, the present invention relates to identifying related concepts of URLs and domain names.

BACKGROUND

Conventional information retrieval systems can retrieve relevant information from a data repository according to Uniform Resource Locators (URL)s and domains. Example information retrieval systems include traditional search engine, which can parse a URL or domain name to generate a set of keywords, and provide ranked relevant web pages based on the keywords. However, a traditional search engine typically generates the set of keywords from URLs or domain names based on simple keyword matching, which requires that the web pages contain the exact keywords for the keywords to be identified as relevant. Therefore, conventional information retrieval systems fail to detect related concepts. Accordingly, a need exists for an improved solution for identifying information regarding related concepts of URLs and domain names. A further need exists for an improved solution for targeting advertisements based on this information.

SUMMARY

The following summary of the invention is provided in order to provide a basic understanding of some aspects and features of the invention. This summary is not an extensive overview of the invention, and as such it is not intended to particularly identify key or critical elements of the invention, or to delineate the scope of the invention. Its sole purpose is to present some concepts of the invention in a simplified form as a prelude to the more detailed description that is presented below.

A solution for identifying related concepts of URLs and domain names includes using structural parsing to extract information from user input comprising a URL or domain name. The information includes one or more of a protocol, a location, and a subdirectory. Semantic parsing of the information is used to identify a first one or more concepts represented by one or more tokens within the extracted information. A content association map is queried to retrieve a second one or more concepts related to the first one or more concepts. Each of the concepts represents a unit of thought, expressed by a term, letter, or symbol. The concept association map includes a representation of concepts, concept metadata, and relationships between the concepts. The first one or more concepts and the second one or more concepts are ranked, and the ranked concepts are stored for displaying to one or more users of the computer platform.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
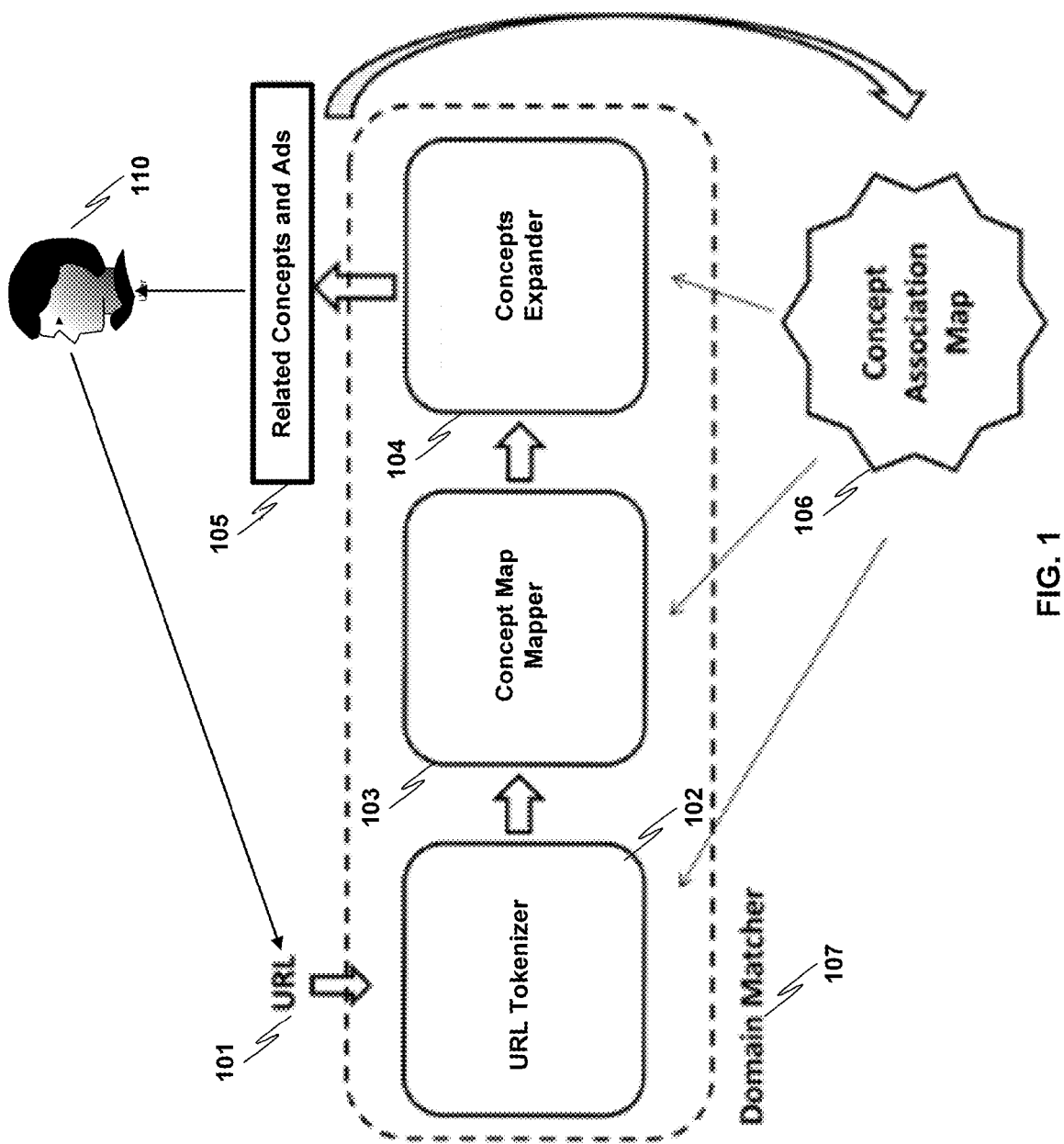
FIG. 1 is a block diagram that illustrates a system for identifying related concepts of URLs and domain names in accordance with one embodiment of the present invention.

Embodiments of the present invention are described herein in the context of identifying related concepts of URLs and domain names. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

Embodiments of the present invention provide an improved method for determining a user's intent in submitting a particular URL or domain name. A URL tokenizer performs structural parsing to extract information such as protocol, domain name, location, and possible delimiters. Additionally, semantic parsing maps a URL to semantically related concepts. Instead of only looking for the exact keywords, the embodiments of the present invention then expands the semantically related concepts and URL tokens into groupings of conceptually related concepts, where different groupings capture different user intentions. Each such grouping is analyzed to provide relevant content such as concept categorization data and advertisements. Embodiments of the present invention can better capture the user's intention even when the original URL or domain name contains typographical errors, or lacks valid click through rate (CTR) and cost per click (CPC) data.

In the context of the present invention, the term "concept" refers to a unit of thought, expressed by a term, letter, or symbol. It may be the mental representation of beings or things, qualities, actions, locations, situations, or relations. A concept may also arise from a combination of other concepts. Example concepts include "diabetes," "heart disease," "socialism," and "global warming."

In the context of the present invention, the term "concept map" or "concept association map" refers to a representation of concepts, concept metadata, and relationships between the concepts. This representation can be in the form of a graph having nodes as concepts and bidirectional multi edges defining different type of relationships between concepts. The concept nodes can be associated with different kinds of metadata, including the frequency of appearance of the concept in a given set of documents, structural relevance (including hierarchy) of the concept in the graph, CPC and CTR data for ads associated to the concept, CTR data for the concept itself as derived from user browsing patterns, as well as a labeling that associates the concept to a specific category. The concept's relationship edges may include information such as page co-occurrence or functional relationships as extracted from the World Wide Web, CPC and CTR information from advertisement and paid listings, co-occurrence in advertiser campaigns, taxonomies and manually generated maps, and user behavior like query log funnels. An embodiment of the concept association map is defined in "Methods and apparatus for discovering relevant concept and context for content specific node" by Behnam A. Rezaei and Riccardo Boscolo (2008), the contents of which are incorporated herein in its entirety.

In the context of the present invention, the term "community" refers to a subgraph of a concept map.

FIG. 1 is a block diagram that illustrates a system for identifying related concepts of URLs and domain names in accordance with one embodiment of the present invention. As shown in FIG. 1, domain matcher 107 comprises a URL tokenizer 102, a concept map mapper 103, and a concepts expander 104. The URL tokenizer 102 is configured to receive an input URL 101 from a user 110 via an application such as a web browser, and map the input URL 101 to semantically related concepts in the concept association map 106 (if available) or URL tokens. Concept map mapper 103 is configured to map the output of the URL tokenizer 102 to one or more seed concept nodes in the concept association map 106. The concepts expander 104 is configured to, starting from the seed concepts, extract sub-graphs from the concept association map 106 which include related concepts in possible different groupings. These groupings of concepts can be further analyzed to provide relevant ads 105. According to another embodiment of the present invention, the concept association map 106 is updated based at least in part on user feedback regarding the related concepts and ads.

Figure 1A:
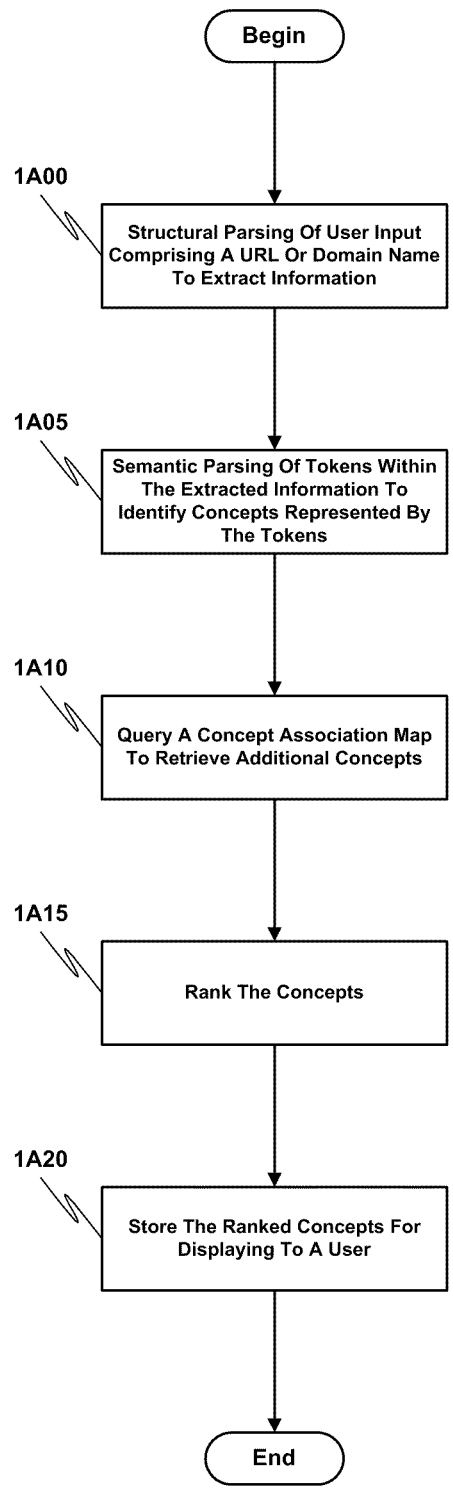
FIG. 1A is a flow diagram that illustrates a method for identifying related concepts of URLs and domain names in accordance with one embodiment of the present invention.

FIG. 1A is a flow diagram that illustrates a method for identifying related concepts of URLs and domain names in accordance with one embodiment of the present invention. The processes of FIG. 1A may be implemented in hardware, software, firmware, or a combination thereof. The processes of FIG. 1A may be implemented by domain matcher 107 of FIG. 1. At 1A00, user input comprising a URL or domain name is parsed to extract information. The extracted information comprises a location, a domain name, a subdirectory name, a protocol, or any combination thereof. At 1A05, semantic parsing of the tokens within the information extracted is performed to identify concepts represented by the tokens. At 1A10, a concept association map is queried to retrieve additional concepts. At 1A15, concepts obtained at 1A05 and 1A10 are ranked. The concepts may be ranked according to a number of occurrences of the concept in query logs, a number of occurrences of the concept in web pages, cost per click, and click through rate. At 1A20, the ranked concepts are stored for displaying to a user.

Figure 2:
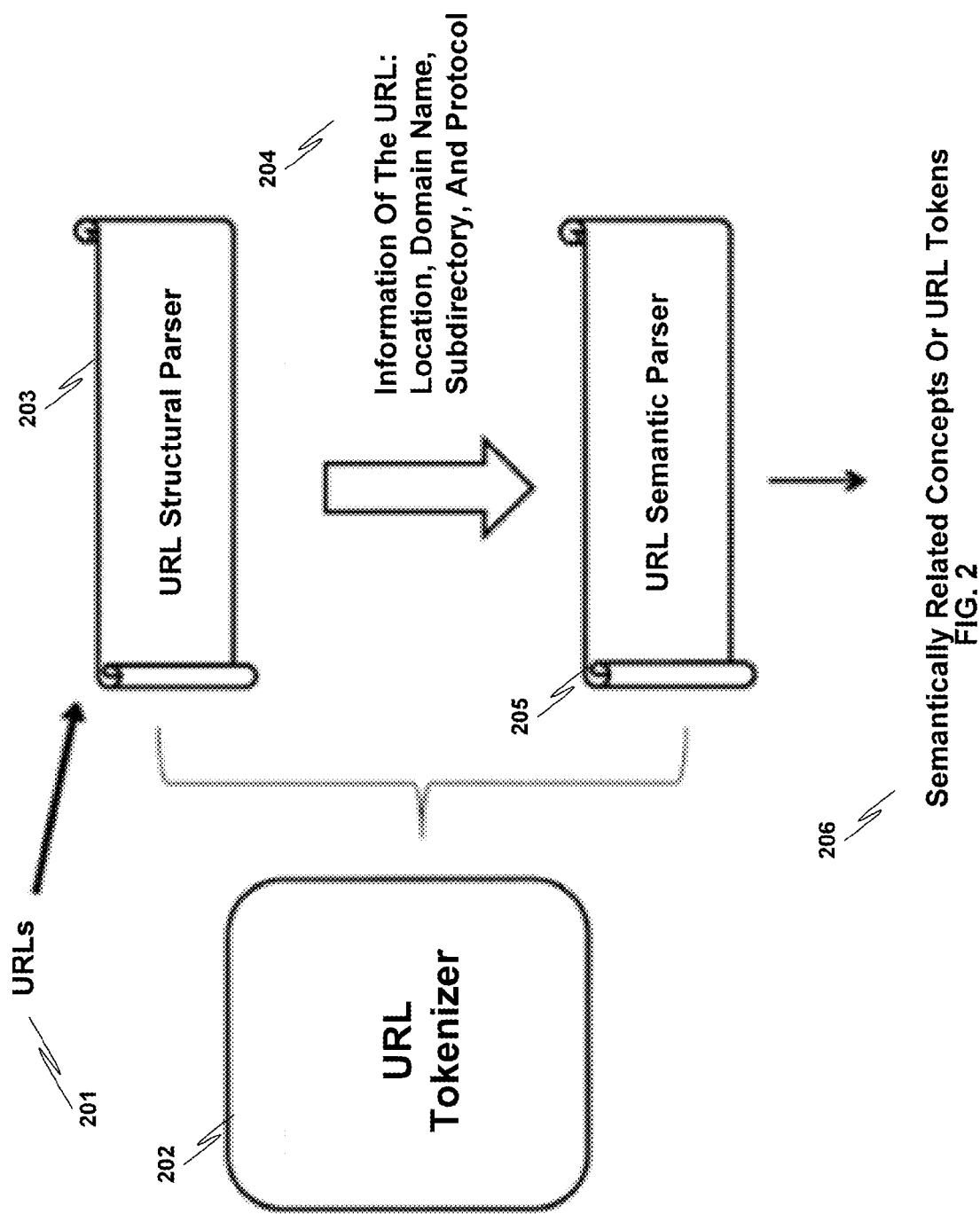
FIG. 2 is a block diagram that illustrates URL tokenization in accordance with one embodiment of the present invention.

FIG. 2 is a block diagram that illustrates URL tokenization in accordance with one embodiment of the present invention. FIG. 2 provides more detail for URL tokenizer 102 of FIG. 1. As shown in FIG. 2, URL tokenizer 202 includes a URL structural parser 203 and a semantic parser 205. The structural parser 203 utilizes a common URL structure to analyze the input domain name or URL 201, and extracts information 204 such as the protocol, the domain, the sub-directory, and the location. The information 204 is input to URL semantic parser 205 for further extracting semantically related concepts and URL tokens 206.

Figure 3:
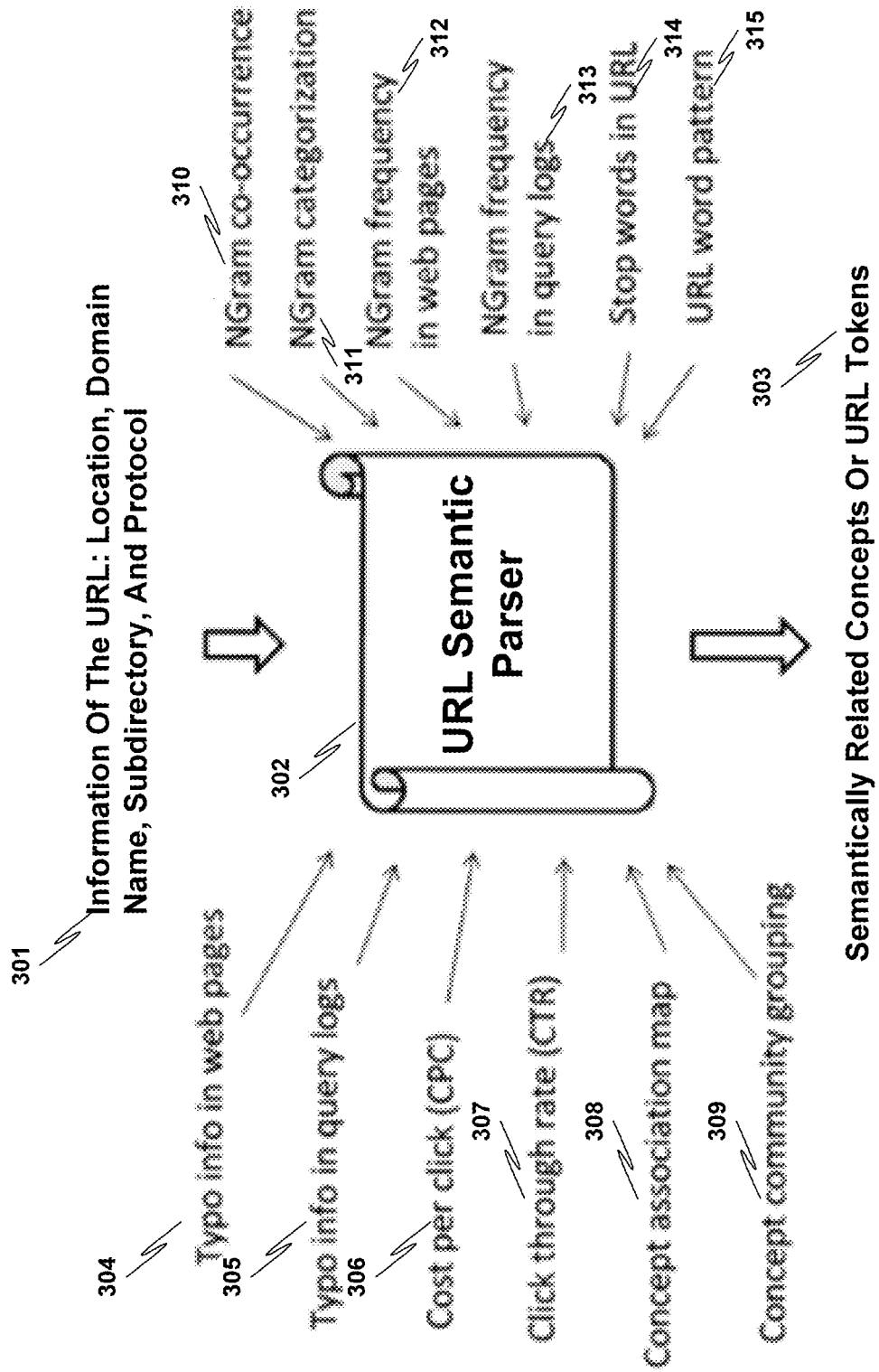
FIG. 3 is a block diagram that illustrates URL semantic parsing in accordance with one embodiment of the present invention.

FIG. 3 is a block diagram that illustrates URL semantic parsing in accordance with one embodiment of the present invention. FIG. 3 provides more detail regarding methods URL semantic parser 205 could use to perform semantic parsing. As shown in FIG. 3, URL semantic parser 302 is configured to receive an input location, domain name, subdirectory, and protocol information of the URL (301). URL semantic parser 302 is further configured to use various metrics (304-315) to analyze the input and provide output in the form of semantically related concepts or URL tokens 303. The metrics include typographical information in web pages (304), typographical information in query logs (305), CPC data (306), CTR data (307), a concept association map (308), a concept community grouping (309), NGram co-occurrence (310), NGram categorization (311), NGram frequency in web pages (312), NGram frequency in query logs (313), stop words in the URL (314), and a URL word pattern (315). The various metrics (304-315) are described below in more detail.

According to one embodiment of the present invention, the URL semantic parser 302 uses a concept association map, a concepts community grouping, and concept categorization data to identify the semantically related concepts 303 if available. An example is described below with reference to FIG. 4.

Figure 4:
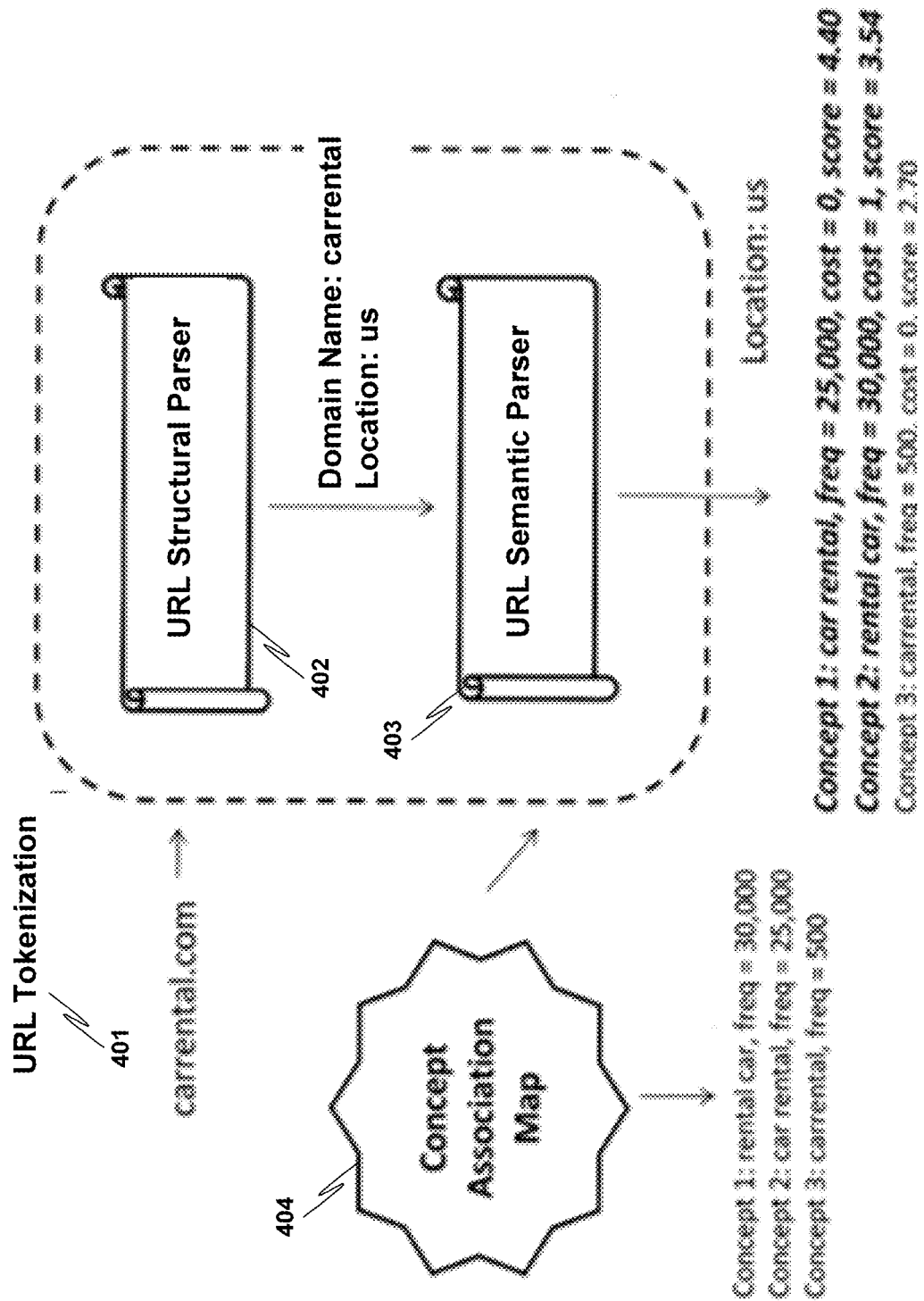
FIG. 4 is a block diagram that illustrates tokenizing a URL and mapping the URL to semantically related concepts in accordance with one embodiment of the present invention.

FIG. 4 is a block diagram that illustrates tokenizing a URL and mapping the URL to semantically related concepts in accordance with one embodiment of the present invention. A URL structural parser 402 extracts (401) the domain name "carrental" and location info "us" from the input URL "carrental.com." Three concept nodes, "rental car," "car rental," and "carrental" are identified from concept association map 404 accordingly, and they are ranked according to a scoring scheme including the concept frequency, the CPC and CTR data of the concepts, the cost for term position switch and number mismatch (default to be 1), and the relevant cost to the length of a domain name.

According to one embodiment of the present invention, the scoring scheme applies more weight to concepts with higher CPC, CTR and frequency, and penalizes changes more severely in short domain names. In the aforementioned example, the concepts "car rental" and "rental car" are ranked higher than "carrental," since they have a higher frequency, and they, along with the specific location "uk," may be given to a concept map mapper for further analysis. The determination of which concepts are submitted to a concept mapper may be based at least in part on whether the score attributed to a concept is at least a predetermined score value. In the present example illustrated by FIG. 4, the "car rental" concept score is 4.40, the "rental car" concept score is 3.54, and the "carrental" concept score is 2.70. If the predetermined score value is 3.00, the "car rental" and "rental car" concepts would be submitted to the concept mapper, while the "carrental" concept would not be submitted to the concept mapper.

According to another embodiment of the present invention, the URL semantic parser (reference numeral 302 of FIG. 3) uses typographical error information from web pages, query logs, or from both sources to check for typographical errors in an input URL. An example is described below with reference to FIG. 5.

Figure 5:
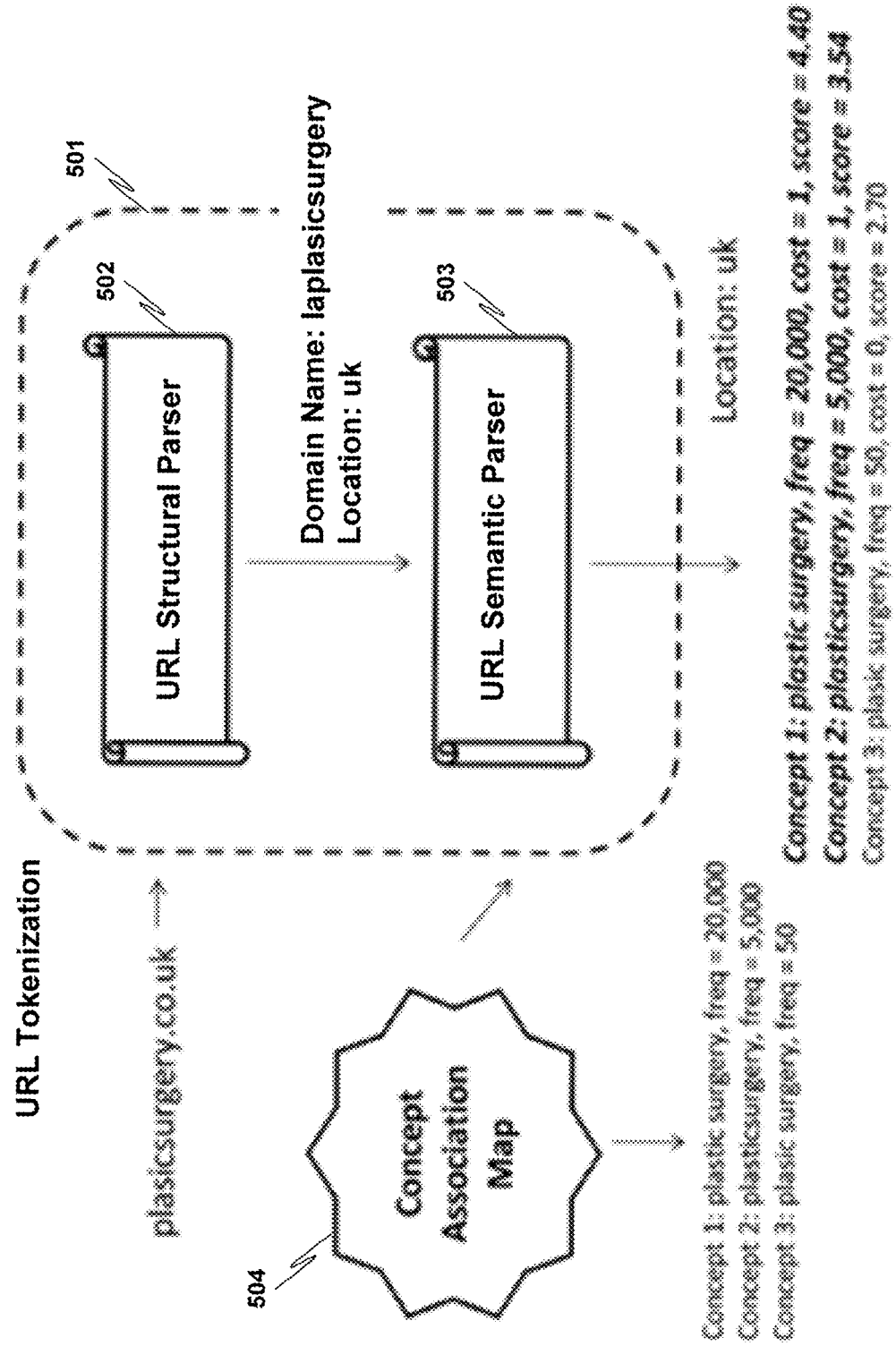
FIG. 5 is a block diagram that illustrates tokenizing a URL, correcting a typographical error in the URL, and mapping the corrected URL to semantically related concepts in accordance with one embodiment of the present invention.

FIG. 5 is a block diagram that illustrates tokenizing a URL, correcting a typographical error in the URL, and mapping the corrected URL to semantically related concepts in accordance with one embodiment of the present invention. FIG. 5 shows another example of tokenizing the URL "plasicsurgery.co.uk." The URL structural parser 502 extracts the domain name "plasicsurgery" and location info "uk." Although the exact concept "plasic surgery" exists in the concept association map, it is identified as the typographical error for two other concepts "plastic surgery" and "plasticsurgery" via the typographical error screening operation and thus will be filtered. The identification of "plasic surgery" as a typographical error is based at least in part on the relatively small frequency of "plasic surgery" (50) compared to "plasticsurgery" (5,000) and "plastic surgery" (20,000).

According to one embodiment of the present invention, the typographical error screening operation uses the off-line tagged typographical error information in both web pages and a user query log.

According to another embodiment of the present invention, the typographical error screening operation identifies possible typographical error candidates online by ranking similarly pronounced and spelled concepts. For example, the set of typographical error candidates includes concepts with a similar sound indexed code, and concepts with limited word pattern changes such as swapping two characters, insertion, removal, and replacement one or two characters. The scoring scheme for typographical error screening utilizes information such as the CPC and CTR data, the concepts frequency, and the relevant cost of the change in the domain name. According to one embodiment of the present invention, candidates for which the relevant cost for correcting a typographical error is smaller compared to the concept frequency gain are favored.

According to another embodiment of the present invention, a URL semantic parser uses an NGram (a phrase including N words) categorization, NGram frequency information from both web pages and query logs, stop words, as well as the word pattern including separators, letter case and number positions in a URL to generate semantically meaningful tokens. An example is described below with reference to FIG. 6.

Figure 6:
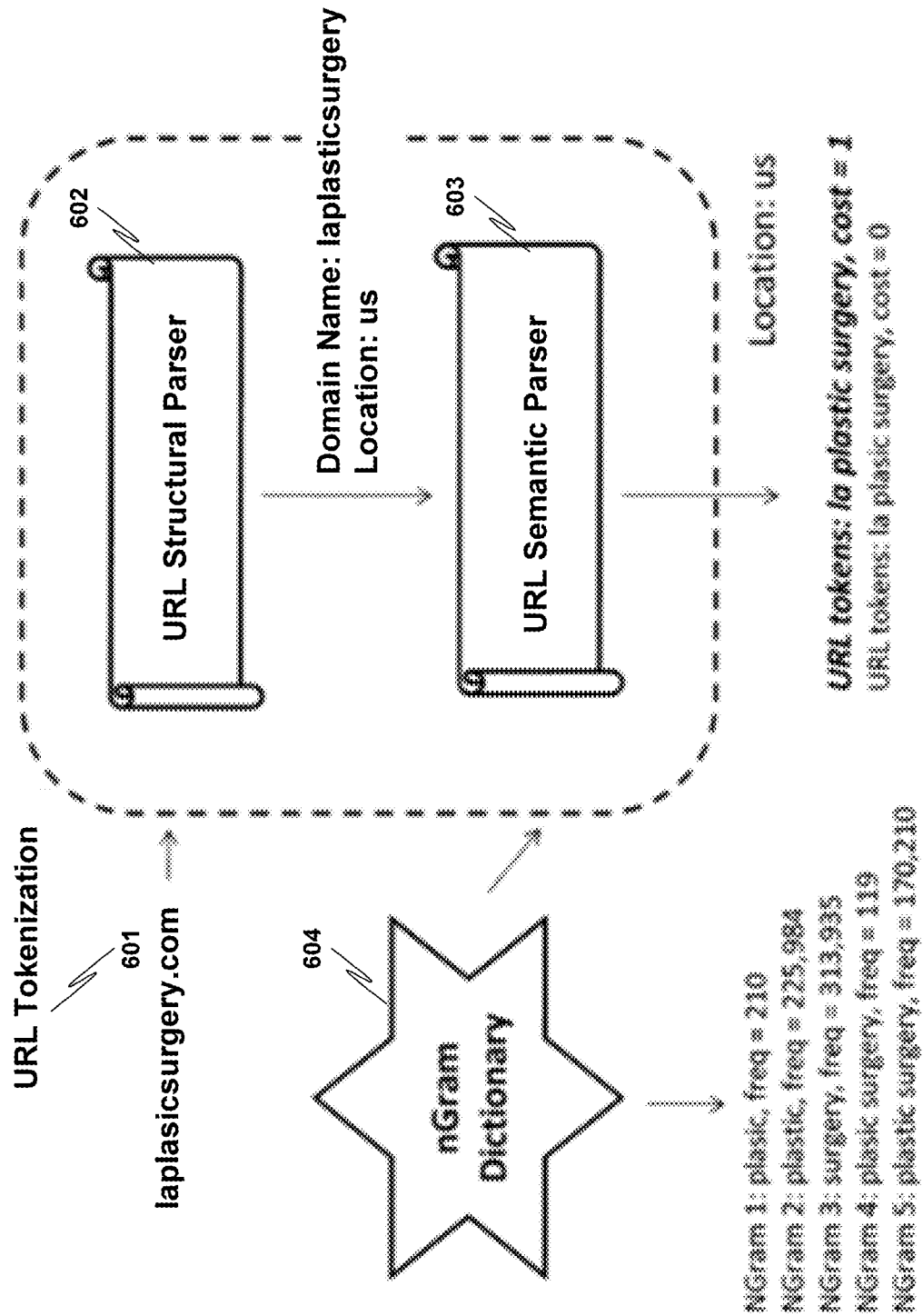
FIG. 6 is a block diagram that illustrates tokenizing correcting and tokenizing the URL as a list of semantically meaningful URL tokens in accordance with one embodiment of the present invention.

FIG. 6 is a block diagram that illustrates tokenizing correcting and tokenizing the URL as a list of semantically meaningful URL tokens in accordance with one embodiment of the present invention. FIG. 6 shows another example of generating URL tokens for the URL "laplasicsurgery.com." The URL structural parser 602 extracts the domain name "laplasicsurgery" and location info "us." Since there is no concept node identified to match "laplasicsurgery" even after the typographical error screening processing, the semantic URL parser 603 tries different ways of splitting the input domain name. Various splitting methods are described in more detail below.

According to one embodiment of the present invention, an NGram dictionary is used in determining how to tokenize a URL. An NGram dictionary may be extracted from html, other markup language documents, and text files. An NGram dictionary may include information such as NGrams, the CPC and CTR data, NGram frequency, NGram categorization, NGram co-occurrence, and offline tagged typographical error NGrams and their corrected versions.

Various methods for determining possible splitting paths (the positions at which the domain name should be broken into tokens) may be used in accordance with embodiments of the present invention. According to one embodiment of the present invention, a search is performed for the longest word and break at that position (the greedy method). According to another embodiment of the present invention, a search is performed for the second longest word and break (the sub-greedy method). According to another embodiment of the present invention, a search is performed for the frequent words (checking its typographical error corrected target words frequency as well), and break. According to a further embodiment of the present invention, the URL is parsed URL in both the normal direction (searching from the beginning) and the reverse direction (searching from the end). According to another embodiment of the present invention, a combination of two or more of the aforementioned splitting methods are used.

According to another embodiment of the present invention, the set splitting paths can be further expanded to include an online created and offline tagged typographical error candidates set. The splitting paths may be ranked via a scoring scheme that combines information such as CPC and CTR data, NGram category, NGram frequency from web pages and query log, NGram co-occurrence, the number of generated tokens, the relevant cost of the change in the domain name, as well as the word pattern in the domain name. The scoring scheme may favor candidates that result in less fragmentation, since a splitting path with many short words, such as words with two or three characters, is very likely to be noise. In addition, a word pattern that includes separators such as a dash or question mark (for example "geo-mall.com"), numbers (for example "mp3world.com"), and letters having mixed case (for example "CandySale.com") may provide additional information about a possible splitting position. In the example shown in FIG. 6, the cost for correcting "plasic" to "plastic" is 1, while the NGram co-occurrence frequency for "la plastic surgery" is much higher than "la plasic surgery" and "lap lasic surgery." Thus "la plastic surgery" is ranked higher than the other paths such as "la plasic surgery" or "lap lasic surgery."

According to one embodiment of the present invention, an initial set of splitting paths is generated using the scheme mentioned above. Then the whole set is expanded to include all combinations of typographical error candidates. For example, if a splitting path is denoted as "$W_A W_B$" (where $W_A$ and $W_B$ are two uni-Grams), and $W_A$ is identified to be typographical error for both $W_A^1$ and $W_A^2$, $W_B$ is identified to be typographical error for both $W_B^1$ and $W_B^2$, the system keeps track of all four combinations as "$W_A^1 W_B^1$", "$W_A^2 W_B^1$", "$W_A^1 W_B^2$" and "$W_A^2 W_B^2$". The system then uses the aforementioned scoring scheme to rank, prune, and generate the final valid set.

According to one embodiment of the present invention, each uni-Gram is associated with its best corrected uni-Gram candidate if possible. For an instance, if $W_A$ is identified as the typographical error for all uni-Grams $W_A^1, W_A^2, \ldots, W_A^n$, $W_A^*$ will be denoted as the best corrected uni-Gram candidate if it is ranked the highest according to a scoring scheme mentioned above. Or if $W_A$ is not identified as a typo, it is denoted as the best corrected uni-Gram candidate for itself. Then the initial set of splitting paths is generated according the scheme mentioned previously, and the initial set is pruned using the scoring scheme mentioned above (for example, keeps only the top 5 splitting paths), but each uni-Gram's statistics is replaced with that of its best corrected candidate. Then only the pruned set is expanded to incorporate all combinations of typographical errors, ranking and pruning are performed to create the final valid set. This scheme achieves higher time and space efficiency by limiting the number of expandable splitting paths.

According to another embodiment of the present invention, the URL semantic parser incorporates the cost per click (CPC) and clickthrough ratio (CTR) data to rank the results. According to one embodiment of the present invention, higher CPCs and CTRs indicate a better ranking.

According to one embodiment of the present invention, the URL semantic parser uses a combination of two or more of the aforementioned methods to perform semantic parsing.

Figure 7:
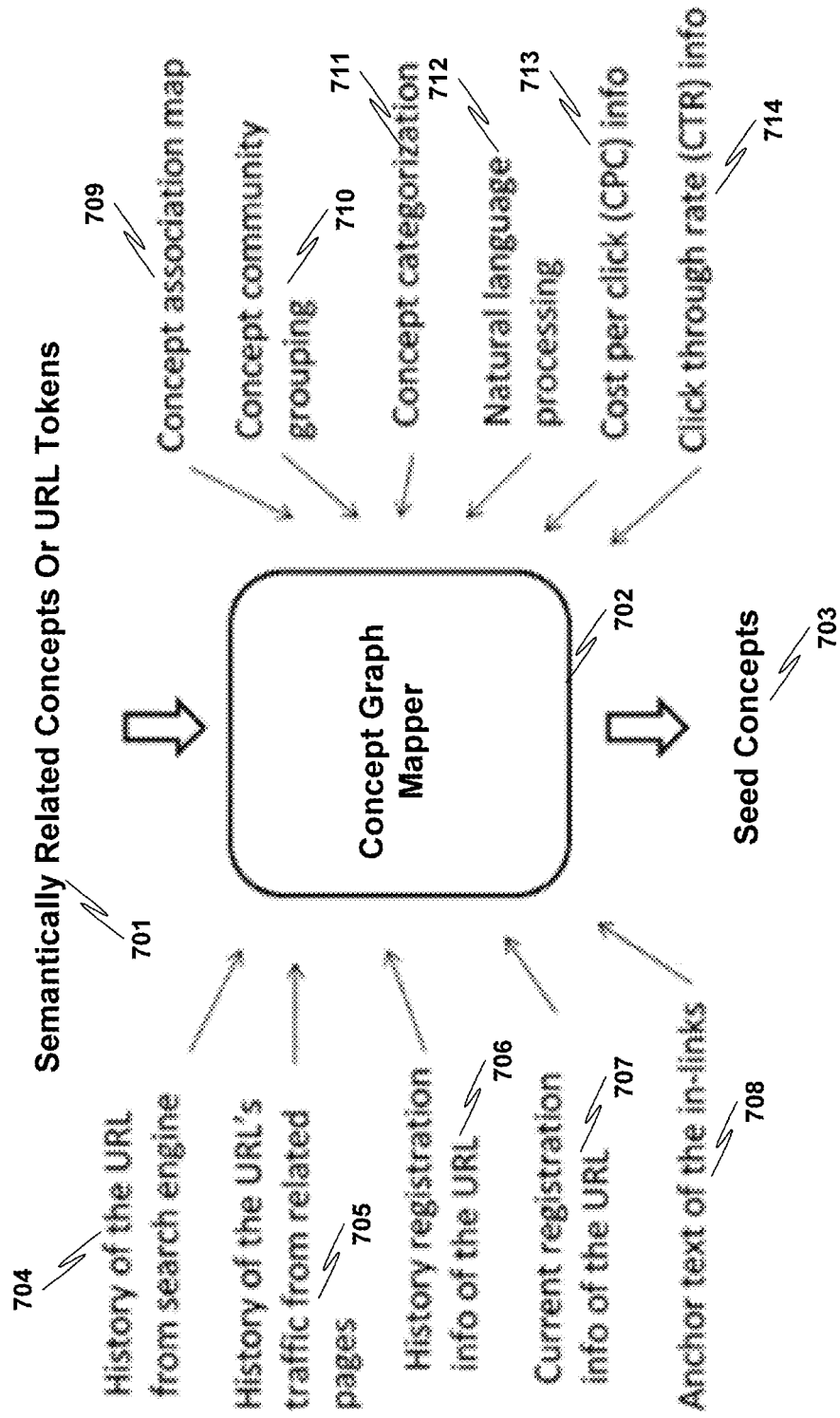
FIG. 7 is a block diagram that illustrates methods used in concept graph mapper in accordance with one embodiment of the present invention.

The concept map mapper is configured to project concepts, keywords, and phrases on a predefined conceptual map by clustering and pruning them. FIG. 7 illustrates different methods of this mapping.

According to one embodiment of the present invention, the concept map mapper uses traffic history of the URL from search engine (704) and related pages (705), and the history registration information (706) to identify seed concept nodes capturing previous user intention, since some users might not have noticed changes in the webpage content.

According to another embodiment of the present invention, the concept map mapper uses the anchor texts from the in-links (708), the current registration information of the URL (707), the concept association map (709), the concept community grouping (710) and concept categorization data (711), the CTR (714) and CPC (713) data to select seed concept nodes.

According to another embodiment of the present invention, the concept map mapper performs natural language processing to assess the relevant importance of the tokens. For example, "facts about Greece," the system analyzes the pattern "A about B" and applies more weight to the latter token ("Greece").

According to one embodiment of the present invention, the concept map mapper uses a combination of two or more of the aforementioned methods for determining seed concepts.

Figure 8:
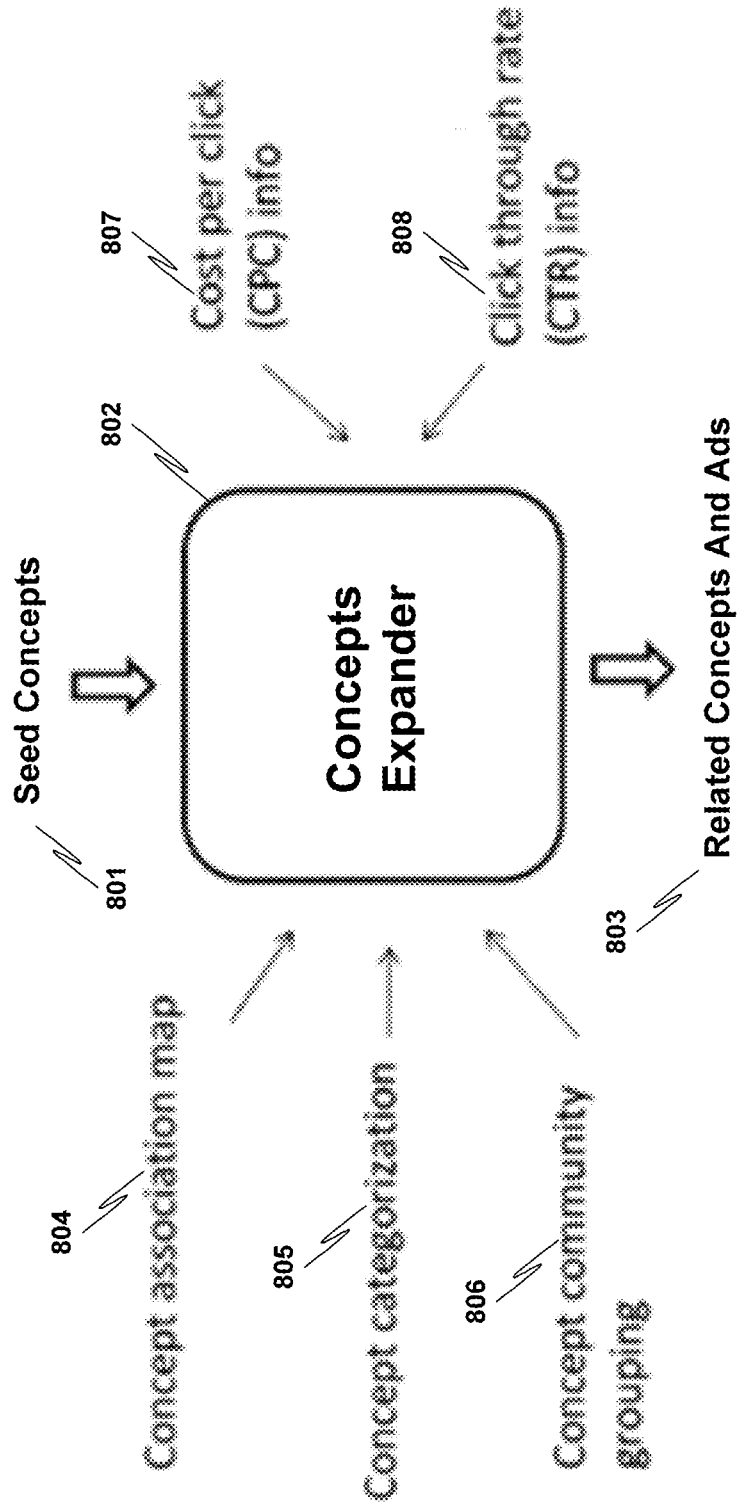
FIG. 8 is a block diagram that illustrates methods used in concepts expander in accordance with one embodiment of the present invention.

FIG. 8 is a block diagram that illustrates methods which may be used by a concepts expander 802 to expand the user intention into multiple contexts, and further identify relevant content. A concepts expander 802 can use information such as a concept association map 804, a concept community grouping 806 and concept categorization data 805, CTR data 808, and CPC data 807.

One embodiment of both the concepts mapping and expanding is described in "Methods and apparatus for dis-covering relevant concept and context for content specific node" by Behnam A. Rezaei and Riccardo Boscolo (2008).

Figure 9:
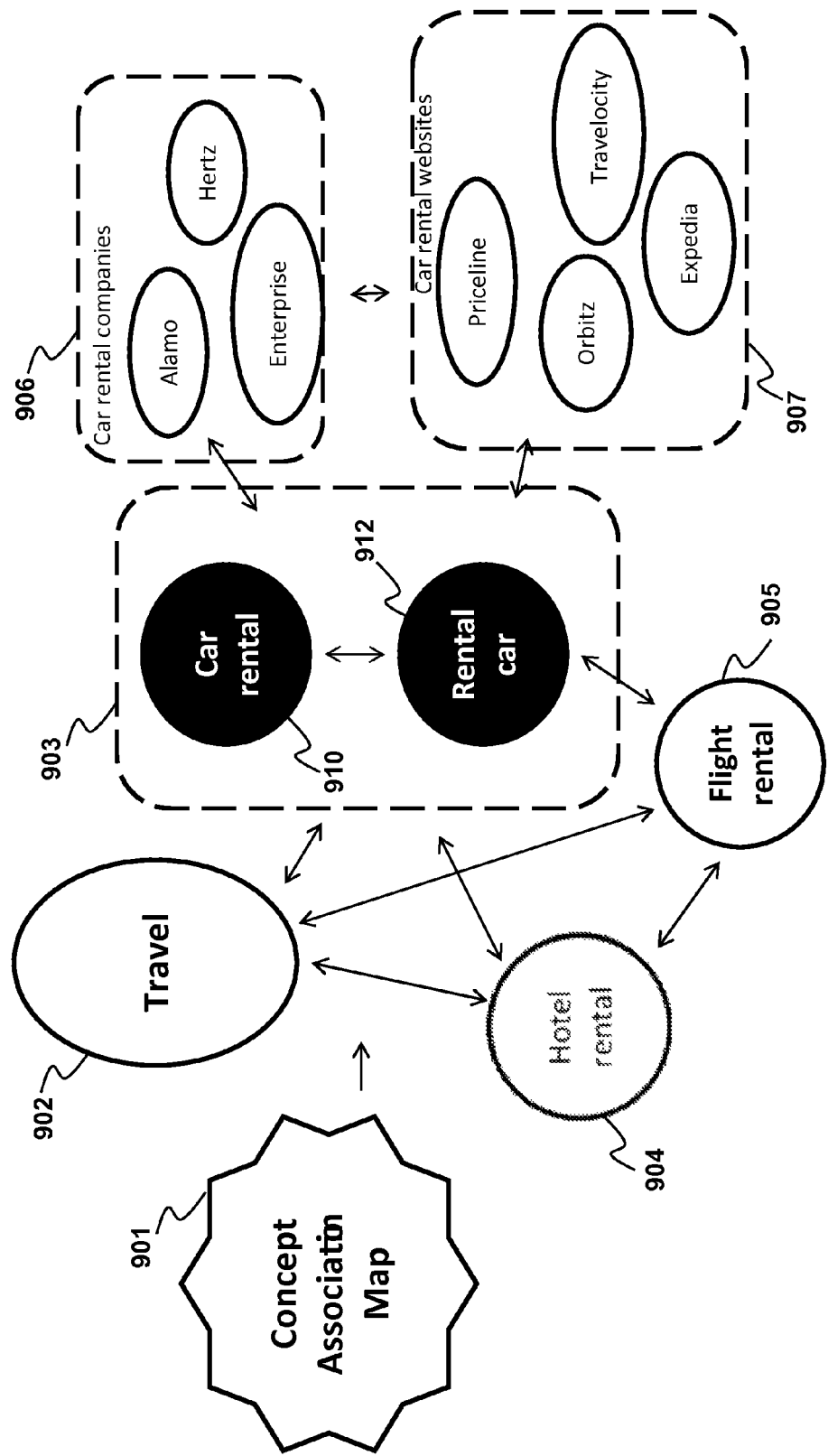
FIG. 9 is a block diagram that illustrates a region of interest in concept space for two semantically related concepts and how the region can be divided into different regions, each representing a particular context of user intention, in accordance with one embodiment of the present invention.

FIG. 9 is a block diagram that illustrates a region of interest in concept space for two semantically related concepts and how the region can be divided into different regions, each representing a particular context of user intention, in accordance with one embodiment of the present invention. In FIG. 9, an example of projecting and expanding two semantic concepts "car rental" 910 and "rental car" 912 is shown. These two nodes are grouped together in the concept association map according to the concept grouping info. Starting from them, other related concepts may be identified, such as "travel" 902 (parent node), "hotel rental" 904 and "flight rental" 905 (sibling nodes), as well as two set of children nodes grouped as "car rental companies" 906 and "car rental websites" 907.

Figure 10:
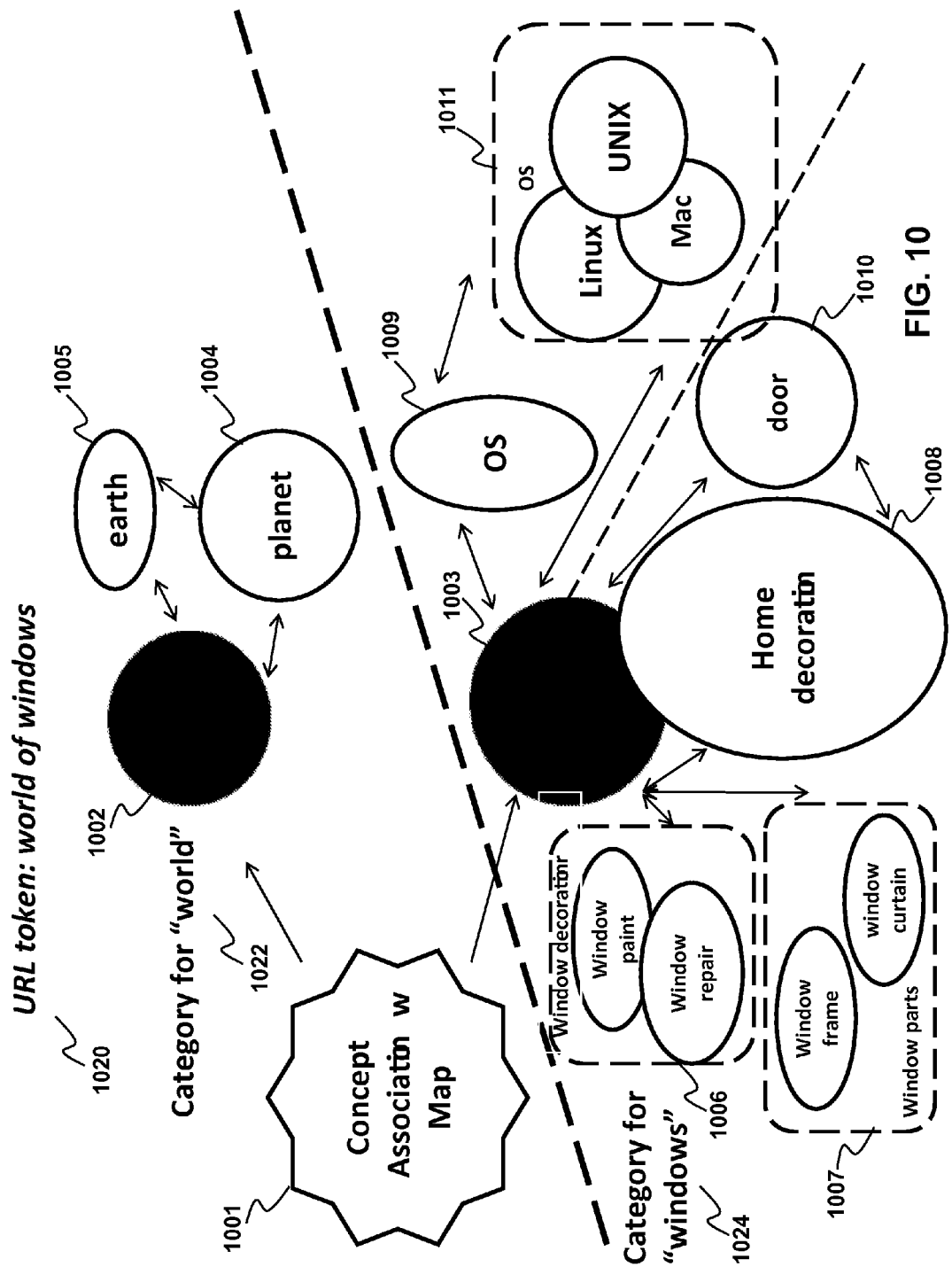
FIG. 10 is a block diagram that illustrates a region of interest in concept space for a list of URL tokens and how the region can be divided into different regions, each representing a particular context of user intention, in accordance with one embodiment of the present invention.

FIG. 10 is a block diagram that illustrates a region of interest in concept space for a list of URL tokens and how the region can be divided into different regions, each representing a particular context of user intention, in accordance with one embodiment of the present invention. FIG. 10 provides an another example of projecting and expanding a list of URL tokens, "world of windows," 1020 is shown in FIG. 10. Since "of" is a stop word, this list of tokens will initially be mapped to two concept nodes "world" 1022 and "windows" 1024 in two different groupings ("world" 1022 is associated with nodes such as "planet" 1004, while "windows" 1024 is associated with nodes such as "home decoration" 1008 and "operating systems" 1009). Natural language processing of the pattern "A of B" gives more weight to the latter term ("windows"). In addition, the CPC and CTR data favors "windows" to "world". Starting from the seed node "windows" 1024, two major concepts groupings, "home decoration" 1008 and "operating systems" 1009 would be expanded.

Figure 11:
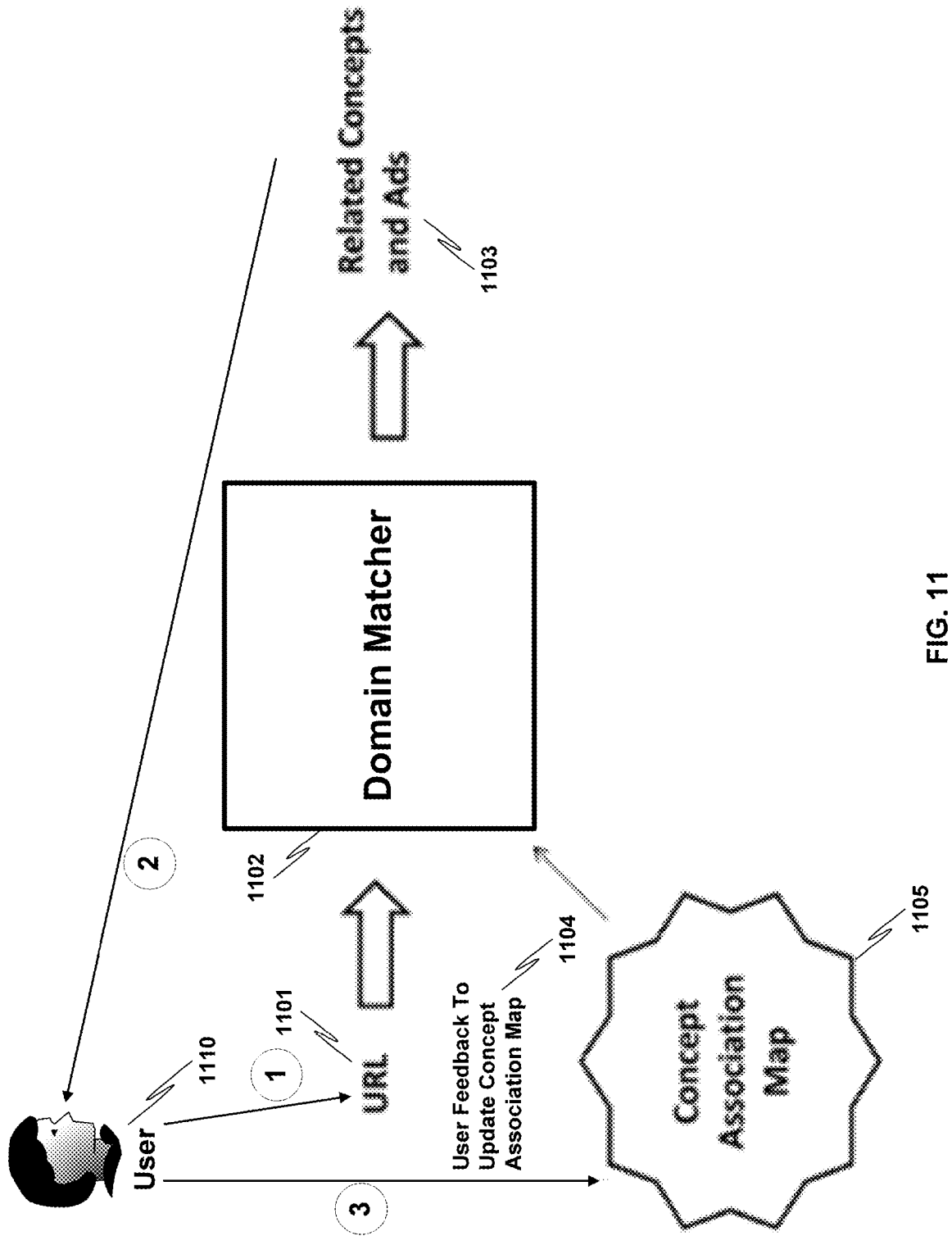
FIG. 11 is a block diagram that illustrates using user feedback to update a concept association map in accordance with one embodiment of the present invention.

FIG. 11 is a block diagram that illustrates using user feedback to update a concept association map in accordance with one embodiment of the present invention. FIG. 11 illustrates an embodiment of the invention wherein the domain matcher 1102 is utilized to provide output 1103 to a user 1110. For example, a user 1110 may send a URL 1101 to domain matcher 1102, e.g., by entering it in a query in a browser. The domain matcher 1102 would parse the URL 1101, analyze it for words and phrases, obtain ranked concept relating to the URL, and send the related concepts 1103 and the ranking to be displayed on the user's monitor. According to another example, a user 1110 may enter the URL 1101 in a browser in order to call a webpage. An intercepting program (not shown) may be used to capture the URL 1101 and forward it to the domain matcher 1102. The domain matcher 1102 would parse the URL 1101, analyze it for words and phrases, and obtain ranked concept relating to the URL 1101, An ads bank (not shown), may then be queried to obtain ads 1103 that are relevant at least to the top ranking concept. The ads 1103 are then transmitted to be displayed on the user's monitor.

The user feedback of the related concepts and ads (1104) could be used to update the concept association map 1105, as shown in FIG. 11. That is, if the user 1110 clicks on a concept or ad sent to the user 1110 based on the analysis of the domain matcher 1102, an indication of the click may be transmitted to the concept association map 1105 to confirm, validate, improve, etc., the concept association map 1105. For example, three types of ads are initially provided for www-.java.com, including JAVA the computer programming language, Java the drink, and Java the island. If a majority of the users 1110 end up clicking the ads related to Java the drink, the concept edge between "JAVA" and "drinks" in the concept map 1105 will be enhanced. According to this embodiment of the present invention, the increasing CPC and CTR for the provided concepts and ads can be used to enhance certain relationships in the concept association map 1105, and vice versa.

Figure 12:
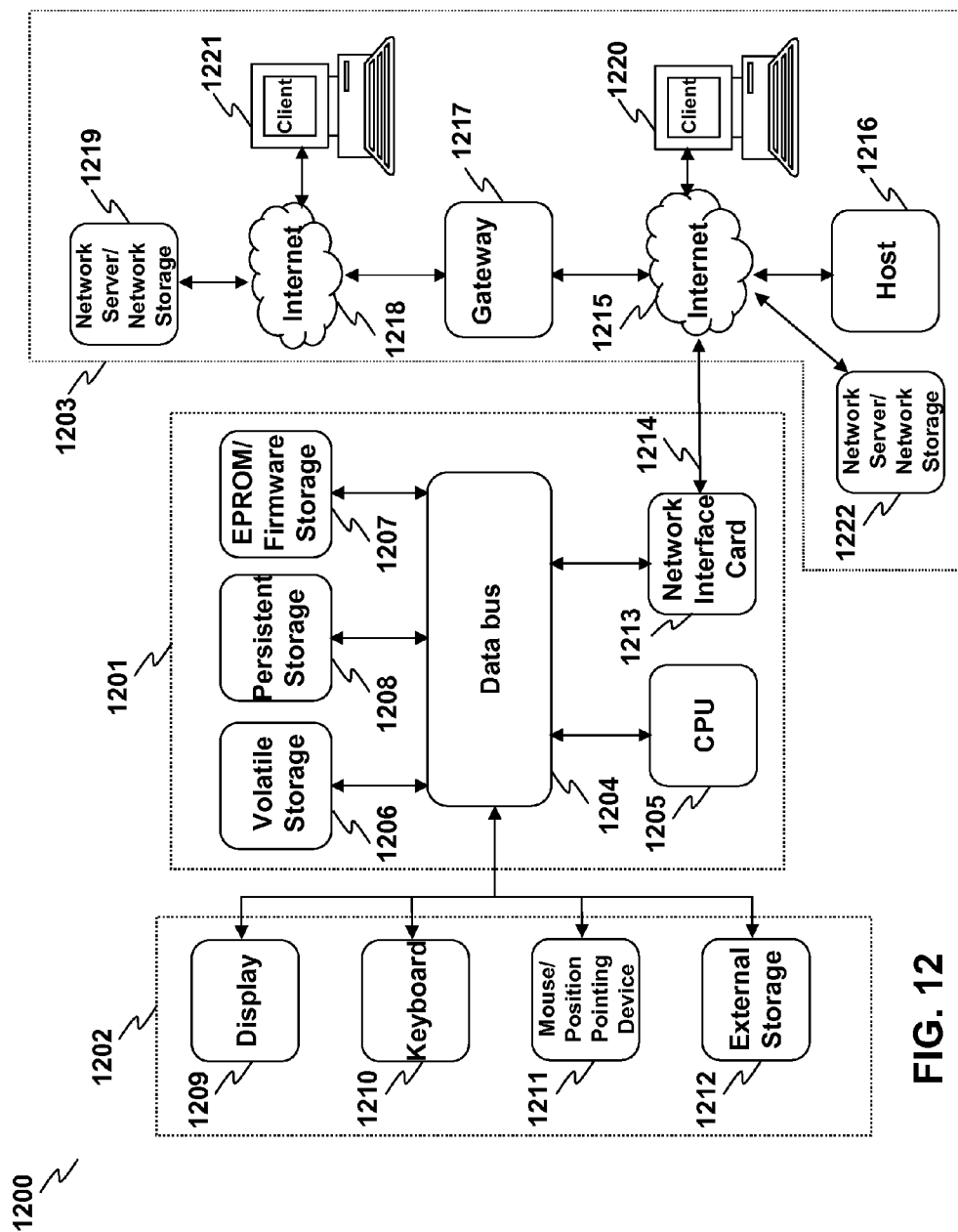
FIG. 12 is a block diagram of a computer system suitable for implementing aspects of the present invention.

FIG. 12 is a block diagram of a computer system 1200 suitable for implementing aspects of the present invention. The system 1200 includes a computer/server platform 1201, peripheral devices 1202 and network resources 1203.

The computer platform 1201 may include a data bus 1204 or other communication mechanism for communicating information across and among various parts of the computer platform 1201, and a processor 1205 coupled with bus 1201 for processing information and performing other computational and control tasks. Computer platform 1201 also includes a volatile storage 1206, such as a random access memory (RAM) or other dynamic storage device, coupled to bus 1204 for storing various information as well as instructions to be executed by processor 1205. The volatile storage 1206 also may be used for storing temporary variables or other intermediate information during execution of instructions by processor 1205. Computer platform 1201 may further include a read only memory (ROM or EPROM) 1207 or other static storage device coupled to bus 1204 for storing static information and instructions for processor 1205, such as basic input-output system (BIOS), as well as various system configuration parameters. A persistent storage device 1208, such as a magnetic disk, optical disk, or solid-state flash memory device is provided and coupled to bus 901 for storing information and instructions.

Computer platform 1201 may be coupled via bus 1204 to a display 1209, such as a cathode ray tube (CRT), plasma display, or a liquid crystal display (LCD), for displaying information to a system administrator or user of the computer platform 1201. An input device 1210, including alphanumeric and other keys, is coupled to bus 1201 for communicating information and command selections to processor 1205. Another type of user input device is cursor control device 1211, such as a mouse, a trackball, or cursor direction keys for communicating direction information and command selections to processor 1204 and for controlling cursor movement on display 1209.

An external storage device 1212 may be connected to the computer platform 1201 via bus 1204 to provide an extra or removable storage capacity for the computer platform 1201. In an embodiment of the computer system 1200, the external removable storage device 1212 may be used to facilitate exchange of data with other computer systems.

Embodiments of the present invention are related to the use of computer system 1200 for implementing the techniques described herein. According to one embodiment of the present invention, the inventive system may reside on a machine such as computer platform 1201. According to one embodiment of the present invention, the techniques described herein are performed by computer system 1200 in response to processor 1205 executing one or more sequences of one or more instructions contained in the volatile memory 1206. Such instructions may be read into volatile memory 1206 from another computer-readable medium, such as persistent storage device 1208. Execution of the sequences of instructions contained in the volatile memory 1206 causes processor 1205 to perform the process steps described herein. In alternative embodiments, hard-wired circuitry may be used in place of or in combination with software instructions to implement embodiment of the present invention. Thus, embodiments of the present invention are not limited to any specific combination of hardware circuitry and software.

It should be noted that embodiments of the present invention are illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

The term "computer-readable medium" as used herein refers to any medium that participates in providing instructions to processor 1205 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1208. Volatile media includes dynamic memory, such as volatile storage 1206. Transmission media includes coaxial cables, copper wire and fiber optics, including the wires that comprise data bus 1204. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1205 for execution. For example, the instructions may initially be carried on a magnetic disk from a remote computer. Alternatively, a remote computer can load the instructions into its dynamic memory and send the instructions over a telephone line using a modem. A modem local to computer system 1200 can receive the data on the telephone line and use an infrared transmitter to convert the data to an infra-red signal. An infra-red detector can receive the data carried in the infra-red signal and appropriate circuitry can place the data on the data bus 1204. The bus 1204 carries the data to the volatile storage 1206, from which processor 1205 retrieves and executes the instructions. The instructions received by the volatile memory 1206 may optionally be stored on persistent storage device 1208 either before or after execution by processor 1205. The instructions may also be downloaded into the computer platform 1201 via Internet using a variety of network data communication protocols well known in the art.

The computer platform 1201 also includes a communication interface, such as network interface card 1213 coupled to the data bus 1204. Communication interface 1213 provides a two-way data communication coupling to a network link 1214 that is connected to a local network 1215. For example, communication interface 1213 may be an integrated services digital network (ISDN) card or a modem to provide a data communication connection to a corresponding type of telephone line. As another example, communication interface 1213 may be a local area network interface card (LAN NIC) to provide a data communication connection to a compatible LAN. Wireless links, such as well-known 802.11 a, 802.11 b, 802.11 g and Bluetooth may also used for network implementation. In any such implementation, communication interface 1213 sends and receives electrical, electromagnetic or optical signals that carry digital data streams representing various types of information.

Network link 1213 provides data communication through one or more networks to other network resources. For example, network link 1214 may provide a connection through local network 1215 to a host computer 1216, or a network storage/server 1217. Additionally or alternatively, the network link 1213 may connect through gateway/firewall 1217 to the wide-area or global network 1218, such as an Internet. Thus, the computer platform 1201 can access network resources located anywhere on the Internet 1218, such as a remote network storage/server 1219. On the other hand, the computer platform 1201 may also be accessed by clients located anywhere on the local area network 1215 and/or the Internet 1218. The network clients 1220 and 1221 may themselves be implemented based on the computer platform similar to the platform 1201.

Local network 1215 and the Internet 1218 both use electrical, electromagnetic or optical signals that carry digital data streams. The signals through the various networks and the signals on network link 1214 and through communication interface 1213, which carry the digital data to and from computer platform 1201, are exemplary forms of carrier waves transporting the information.

Computer platform 1201 can send messages and receive data, including program code, through the variety of network(s) including Internet 1218 and LAN 1215, network link 1214 and communication interface 1213. In the Internet example, when the system 1201 acts as a network server, it might transmit a requested code or data for an application program running on client(s) 1220 and/or 1221 through Internet 1218, gateway/firewall 1217, local area network 1215 and communication interface 1213. Similarly, it may receive code from other network resources.

The received code may be executed by processor 1205 as it is received, and/or stored in persistent or volatile storage devices 1208 and 1206, respectively, or other non-volatile storage for later execution. In this manner, computer system 1201 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the present invention will be apparent to those skilled in the art from consideration of the specification and practice of the present invention disclosed herein. Various aspects and/or components of the described embodiments may be used singly or in any combination in the online behavioral targeting system. It is intended that the specification and examples be considered as exemplary only, with a true scope and spirit of the present invention being indicated by the following claims.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
using structural parsing to extract information from user input comprising a URL or domain name, the information comprising one or more of a protocol, a location, and a subdirectory;
using semantic parsing of the information to identify a first one or more concepts represented by one or more tokens within the extracted information;
determining whether the domain name can be mapped to one or more concepts in the concept association map by switching term positions or changing numbers;
when the domain name can be mapped and if the mapped concepts have high score, identifying the concepts as seed concepts for further querying the concept association map;
when the mapped concepts do not have a high enough score, or the domain name cannot be mapped, then determining whether the input domain name can be mapped to a concept in the concept association map by typographical error correction, the correction comprising one or more of insertion, deletion, and switching or replacement of 1 or 2 characters; and
when the input domain name cannot be mapped by typographical error correction, or if concepts mapped as a result of typographical error correction do not have a high score, determining how to break the domain name into URL tokens by inserting separators at correction positions and correcting the tokens;
querying a concept association map to retrieve a second one or more concepts related to the first one or more concepts, each of the concepts representing a unit of thought, expressed by a term, letter, or symbol, the concept association map comprising a representation of concepts, concept metadata, and relationships between the concepts;

ranking the first one or more concepts and the second one or more concepts to create ranked concepts; and storing the ranked concepts for displaying to one or more users of the computer platform.

2. The method of claim 1, further comprising:

responsive to the displaying, using feedback from the one or more users to update the concept association map.

3. The method of claim 1, further comprising utilizing a top level of the URL to associate a geographical location with the URL.

4. The method of claim 1, further comprising associating a penalty with concept term position switching, number mismatch, and character correction.

5. The method of claim 1, wherein breaking the URL into URL tokens further comprises:

associating a penalty with breaking a domain name into several tokens; and associating a score used to rank, prune and expand URL splitting paths.

6. The method of claim 5, further comprising expanding a set of URL splitting paths according to at least one of:

online generated typographical error candidates; and offline generated typographical error candidates.

7. The method of claim 1 wherein the ranking comprises assigning a score to each concept according to at least one of:

a number of occurrences of the concept in query logs;

a number of occurrences of the concept in web pages;

cost per click; and click through rate.

8. The method of claim 1 wherein the querying comprises assigning a score to each expanded concept according to at least one of:

a concept frequency, an edge weight between a concept and a seed concept;

a cost per click; and a click through rate.

9. The method of claim 2 wherein the updating comprises updating a concept edge weight according to at least one of:

a cost per click; and a click through rate.

10. The method of claim 1, further comprising querying an ads bank to obtain one or more ads based on the ranked concepts; and storing the one or more ads for displaying to the one or more users.

11. An apparatus comprising:

a memory; and one or more processors configured to:

use structural parsing to extract information from user input comprising a URL or domain name, the information comprising one or more of a protocol, a location, and a subdirectory, wherein structural parsing comprises;

determining whether the domain name can be mapped to one or more concepts in the concept association map by switching term positions or changing numbers;

when the domain name can be mapped and if the mapped concepts have high score, identifying the concepts as seed concepts for further querying the concept association map;

when the mapped concepts do not have a high enough score, or the domain name cannot be mapped, then determining whether the input domain name can be mapped to a concept in the concept association map by typographical error correction, the correction comprising one or more of insertion, deletion, and switching or replacement of 1 or 2 characters; and when the input domain name cannot be mapped by typographical error correction, or if concepts mapped as a result of typographical error correction do not have a high score, determining how to break the domain name into URL tokens by inserting separators at correction positions and correcting the tokens;

use semantic parsing of the information to identify a first one or more concepts represented by one or more tokens within the extracted information;

query a concept association map to retrieve a second one or more concepts related to the first one or more concepts, each of the concepts representing a unit of thought, expressed by a term, letter, or symbol, the concept association map comprising a representation of concepts, concept metadata, and relationships between the concepts;

rank the first one or more concepts and the second one or more concepts to create ranked concepts; and store the ranked concepts for displaying to one or more users of the computer platform.

12. The apparatus of claim 11 wherein the one or more processors are further configured to:

responsive to the displaying, use feedback from the one or more users to update the concept association map.

13. The apparatus of claim 11 wherein the one or more processors are further configured to utilize a top level of the URL to associate a geographical location with the URL.

14. The apparatus of claim 11 wherein the one or more processors are further configured to associate a penalty with concept term position switching, number mismatch, and character correction.

15. The apparatus of claim 11 wherein the one or more processors are further configured to break the URL into URL tokens by:

associating a penalty with breaking a domain name into several tokens; and associating a score used to rank, prune and expand URL splitting paths.

16. The apparatus of claim 15 wherein the one or more processors are further configured to expand a set of URL splitting paths according to at least one of:

online generated typographical error candidates; and offline generated typographical error candidates.

17. The apparatus of claim 11 wherein the ranking comprises assigning a score to each concept according to at least one of:

a number of occurrences of the concept in query logs;

a number of occurrences of the concept in web pages;

cost per click; and click through rate.

18. The apparatus of claim 11 wherein the querying comprises assigning a score to each expanded concept according to at least one of:

a concept frequency, an edge weight between a concept and a seed concept;

a cost per click; and a click through rate.

19. The apparatus of claim 12 wherein the updating comprises updating a concept edge weight according to at least one of:

a cost per click; and a click through rate.

20. The apparatus of claim 11 wherein the one or more processors are further configured to:

query an ads bank to obtain one or more ads based on the ranked concepts; and store the one or more ads for displaying to the one or more users.

21. A program storage device readable by a machine, embodying a program of instructions executable by the machine to perform a method, the method comprising:

using structural parsing to extract information from user input comprising a URL or domain name, the information comprising one or more of a protocol, a location, and a subdirectory, wherein structural parsing comprises;

determining whether the domain name can be mapped to one or more concepts in the concept association map by switching term positions or changing numbers;

when the domain name can be mapped and if the mapped concepts have high score, identifying the concepts as seed concepts for further querying the concept association map;

when the mapped concepts do not have a high enough score, or the domain name cannot be mapped, then determining whether the input domain name can be mapped to a concept in the concept association map by typographical error correction, the correction comprising one or more of insertion, deletion, and switching or replacement of 1 or 2 characters; and when the input domain name cannot be mapped by typographical error correction, or if concepts mapped as a result of typographical error correction do not have a high score, determining how to break the domain name into URL tokens by inserting separators at correction positions and correcting the tokens;

using semantic parsing of the information to identify a first one or more concepts represented by one or more tokens within the extracted information;

querying a concept association map to retrieve a second one or more concepts related to the first one or more concepts, each of the concepts representing a unit of thought, expressed by a term, letter, or symbol, the concept association map comprising a representation of concepts, concept metadata, and relationships between the concepts;

ranking the first one or more concepts and the second one or more concepts to create ranked concepts; and storing the ranked concepts for displaying to one or more users of the computer platform.

* * * * *